United States Patent [19]

Floessel

[11] 3,919,456

[45] Nov. 11, 1975

[54] TUBE ENCLOSED PRESSURE GAS INSULATED ELECTRICAL CABLE

[75] Inventor: Carl Dieter Floessel, Fislisbach, Switzerland

[73] Assignee: BBC Brown Boveri & Company Limited, Baden, Switzerland

[22] Filed: Oct. 16, 1974

[21] Appl. No.: 515,157

[30] Foreign Application Priority Data
Nov. 14, 1973  Switzerland.................. 16033/73

[52] U.S. Cl. ........................... 174/27; 174/99 B
[51] Int. Cl.² ..................................... H01B 9/06
[58] Field of Search...... 174/16 B, 28, 29, 27, 99 R, 174/99 B, 148, 149 B

[56] References Cited
UNITED STATES PATENTS

| | | | |
|---|---|---|---|
| 2,141,894 | 12/1938 | Alexanderson ................ | 174/27 X |
| 2,149,223 | 2/1939 | Mason ............................ | 174/27 |
| 2,428,051 | 9/1947 | Touraton ...................... | 174/99 R |
| 3,164,667 | 1/1965 | Frowein ........................ | 174/27 |
| 3,349,168 | 10/1967 | Rehder et al. ................ | 174/99 B |
| 3,730,968 | 5/1973 | Szente-Varga ................ | 174/27 |
| 3,751,578 | 8/1973 | Hoffman ...................... | 174/16 B X |
| 3,767,837 | 10/1973 | Graybill ........................ | 174/27 |
| 3,775,550 | 11/1973 | Olsen ............................ | 174/16 B |

FOREIGN PATENTS OR APPLICATIONS

| | | | |
|---|---|---|---|
| 881,083 | 6/1953 | Germany ...................... | 174/99 B |
| 1,021,444 | 12/1957 | Germany ...................... | 174/99 R |
| 1,448,008 | 6/1966 | France .......................... | 174/99 B |
| 438,560 | 11/1935 | United Kingdom .......... | 174/27 |

*Primary Examiner*—Arthur T. Grimley
*Attorney, Agent, or Firm*—Pierce, Scheffler & Parker

[57] ABSTRACT

A tube enclosed pressure gas insulated electrical cable comprises a three-phase conductor structure arranged within a common tubular enclosure. The respective axes of the phase conductors are located at the apices of an equilateral triangle and are fixed separately to a supporting ring by means of pin-type insulators. Two such insulators are provided for each phase conductor and the axes of each insulator pair are located at a V-angle to each other such as to coincide with the axes of corresponding insulators of other phases, the common axis in each case, when viewed in cross-section passing through the centers of two conductors.

2 Claims, 1 Drawing Figure

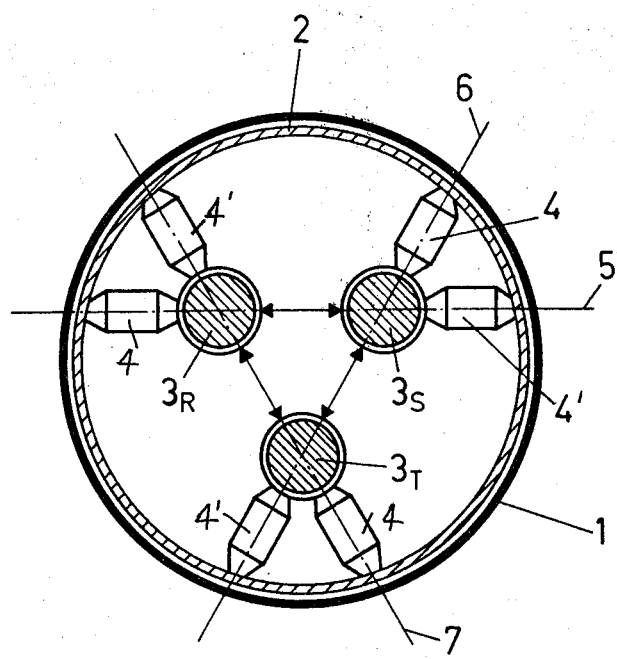

TUBE ENCLOSED PRESSURE GAS INSULATED ELECTRICAL CABLE

The invention concerns an improvement in a tube enclosed pressure gas insulated electrical cable having a three-phase conductor configuration within a common tubular enclosure, the phase conductors being mutually spaced and with their axes located respectively at the apices of a triangle and fixed separately to supporting rings by means of pin-type insultators.

An arrangement of this kind is known from Swiss Pat. No. 524,907, for example, the corresponding patent in the United States being U.S. Pat. No. 3,730,968 granted May 1, 1973. In this case, the phase conductors are fixed inside the tubular enclosure by means of pin-type insulators. The configuration is such that at spaced intervals along the cable there are supporting rings to which each of the phase conductors is attached by way of pin-type insulators.

Viewed in cross-section, the axes of phase conductors form a triangle, preferably equilateral, and the three insulators, one to each phase conductor, are fixed to the supporting ring and arranged such that their longitudinal axes form angles of 120 with respect to each other.

A further known method concerning three-phase enclosed bus-bars for a high-voltage switchgear installation is disclosed in published German patent application DT-AS No. 1,540,618 whereby the insulators at the conductor support points in the immediate vicinity of branch connections are arranged in certain directions relative to the axis of the branch stub of the enclosure in order to improve the mechanical strength against electro-dynamic forces. This known arrangement is not suitable for tube enclosed pressure gas insulated cables, however, because branch stubs are not required for these in practice.

The objective of the invention is to create a simple, and at the same time effective, arrangement for tube enclosed pressure gas insulated cables of the kind stated above which is capable at low cost of withstanding the electrodynamic forces occurring between the phase conductors in particular in the event of a short circuit.

This objective is achieved in that two pin-type insulators per phase conductor are provided at each support point of the phase conductors, the axes of each insulator pair enclosing an angle and being so positioned that they coincide with the axes of the corresponding insulators of the other phases, the common axis in each case, when viewed in cross-section, passing through the centers of two conductors.

A preferred embodiment of the invention is shown in transverse section in the accompanying drawing. This view depicts a three-phase tube enclosed pressure gas insulated cable in cross-section at a point at which the conductors are supported. The tubular enclosure 1, which is of aluminum for example, contains supporting rings 2, only one of which is shown. The latter can be of metal or plastics material. Such supporting rings are arranged at spaced intervals along the length of the tube enclosed cable. The supporting rings 2 are able to slide in the tubular enclosure. In the example chosen, the phase conductors $3_R$, $3_S$, $3_T$ are so arranged that their axes form the apices of an equilateral triangle. Each phase conductor is attached to the supporting ring 2 by means of two pin-type insulators 4, 4. Each pair of insulator pins 4, 4 extends divergently outward from its corresponding phase conductor at an angle of 60° from the conductor axis to their respective points of attachment on the supporting ring 2 and are so positioned that the respective axes of the pins 4, 4 forming the insulator support for each phase conductor are aligned with the axes of the pins 4, 4 forming the respective insulator supports for the other two phase conductors. Each of the tree common pin axes 5, 6 and 7 so formed thus pass through the respective centers of two phase conductors.

With this configuration the insulators 4 and 4, respectively, are favourably stressed mechanically when subjected to electrodynamic forces acting between the phase conductors, particularly in the event of short circuits, i.e. they are stressed essentially in compression since the forces are predominantly forces of repulsion, as indicated by the arrows. That is to say, along axis 6 passing through the axes of phase conductors $3_S$ and $3_T$, a repulsion force acting between these two conductors places the pin-type insulator supports 4, 4 for the conductors in an axial compression. The same compressive force is established between the in-line insulators 4, 4 for the conductors $3_R$, $3_S$ along axis 5, and also between the in-line insulators 4, 4 for the conductors $3_T$, $3_R$ along axis 7.

I claim:

1. In a tube -enclosed pressure gas insulated cable having a three-phase conductor configuration within a common circular tubular enclosure, the respective axes of the phase conductors being located at the apices of a triangle and fixed separately to a supporting ring by means of pin-type insulators, the improvement wherein a pair of pin-type insulators extend divergently outward from each phase conductor to said supporting ring and are so positioned that the respective axes of the two pins forming the insulator support for each phase conductor pass through the center of the conductor and are aligned with the axes of pins forming the respective insulator supports for the other two phase conductors.

2. A tube enclosed pressure gas insulated cable as claimed in claim 1, in which the phase conductors, when viewed in cross-section, form an equilateral triangle.

* * * * *